US008002872B2

(12) United States Patent (10) Patent No.: US 8,002,872 B2
Kruesi (45) Date of Patent: Aug. 23, 2011

(54) METHODS OF RECOVERING AND PURIFYING SECONDARY ALUMINUM

(75) Inventor: Paul R. Kruesi, Golden, CO (US)

(73) Assignee: Carbontech, LLC, Glendale, AZ (US)

( * ) Notice: Subject to any disclaimer, the term of this patent is extended or adjusted under 35 U.S.C. 154(b) by 0 days.

(21) Appl. No.: 12/094,397

(22) PCT Filed: Nov. 22, 2006

(86) PCT No.: PCT/US2006/061227
§ 371 (c)(1),
(2), (4) Date: Oct. 24, 2008

(87) PCT Pub. No.: WO2007/062402
PCT Pub. Date: May 31, 2007

(65) Prior Publication Data
US 2009/0084225 A1    Apr. 2, 2009

Related U.S. Application Data

(60) Provisional application No. 60/739,140, filed on Nov. 22, 2005.

(51) Int. Cl.
*C22B 21/06* (2006.01)
*C25C 3/24* (2006.01)
(52) U.S. Cl. ............... 75/402; 75/686; 205/560
(58) Field of Classification Search ............ 75/414, 75/402, 672, 686, 671; 205/560
See application file for complete search history.

(56) References Cited

U.S. PATENT DOCUMENTS

| 2,198,673 A * | 4/1940 | Loevenstein ............... 75/10.62 |
| 2,964,551 A | 12/1960 | Woolcock |
| 3,755,099 A * | 8/1973 | Haupin ............... 205/375 |
| 3,765,851 A | 10/1973 | White |
| 3,843,457 A | 10/1974 | Grannen et al. |
| 3,870,611 A | 3/1975 | Vestal |
| 3,958,957 A | 5/1976 | Koh et al. |
| 3,959,096 A * | 5/1976 | Langer ............... 205/574 |
| 4,010,098 A | 3/1977 | Fassell |
| 4,021,298 A | 5/1977 | Jones |
| 4,039,433 A | 8/1977 | Peterson |
| 4,092,129 A | 5/1978 | Goudal |
| 4,118,292 A | 10/1978 | Fray et al. |
| 4,148,710 A | 4/1979 | Burton, III |
| 4,148,752 A | 4/1979 | Burger et al. |
| 4,158,637 A | 6/1979 | Jones |
| 4,166,786 A | 9/1979 | Duraiswamy et al. |
| 4,219,415 A | 8/1980 | Nassef et al. |
| 4,246,255 A | 1/1981 | Grantham |
| 4,259,414 A | 3/1981 | Williams |
| 4,279,710 A | 7/1981 | Coughlin |
| 4,435,374 A | 3/1984 | Helm, Jr. |
| 4,447,262 A * | 5/1984 | Gay et al. ............... 588/314 |
| 4,515,659 A | 5/1985 | Wingfield, Jr. et al. |
| 4,670,113 A | 6/1987 | Lewis |
| 4,721,656 A | 1/1988 | Vance et al. |
| 4,793,904 A | 12/1988 | Mazanec et al. |
| 4,897,167 A | 1/1990 | Cook |
| 4,904,356 A * | 2/1990 | Fray ............... 205/367 |
| 4,906,290 A | 3/1990 | Worner |
| 4,962,264 A | 10/1990 | Forester |
| 4,988,417 A | 1/1991 | DeYoung |
| 5,064,733 A | 11/1991 | Krist et al. |
| 5,084,140 A | 1/1992 | Holland |
| 5,090,999 A * | 2/1992 | Iwase ............... 75/433 |
| 5,314,171 A * | 5/1994 | Friedrichs et al. ............ 266/173 |
| 5,330,623 A | 7/1994 | Holland |
| 5,364,821 A | 11/1994 | Holland |
| 5,387,321 A | 2/1995 | Holland |
| 5,441,990 A | 8/1995 | Robin et al. |
| 5,470,380 A | 11/1995 | Jiang et al. |
| 5,678,762 A | 10/1997 | Wood et al. |
| 5,788,739 A * | 8/1998 | Margulis ............... 75/419 |
| 5,821,395 A | 10/1998 | Price et al. |
| 5,853,687 A | 12/1998 | Morlec et al. |
| 5,948,398 A | 9/1999 | Hanamoto et al. |
| 6,184,427 B1 | 2/2001 | Klepfer et al. |
| 6,294,068 B1 | 9/2001 | Petrovic et al. |
| 6,299,994 B1 | 10/2001 | Towler et al. |
| 6,409,974 B1 | 6/2002 | Towler et al. |
| 6,451,094 B1 | 9/2002 | Chang et al. |
| 6,458,478 B1 | 10/2002 | Wang et al. |
| 6,548,197 B1 | 4/2003 | Chandran et al. |
| 6,929,752 B2 | 8/2005 | Cansell |
| 7,425,315 B2 | 9/2008 | Kruesi |

(Continued)

FOREIGN PATENT DOCUMENTS

AU    624369    6/1992

(Continued)

OTHER PUBLICATIONS

Machine translation of JP 59-059846, published Apr. 5, 1984.*
U.S. Appl. No. 12/467,618, filed May 18, 2009, Kruesi.
Huang, et al., "Activation of methane in microwave plasmas at high pressure", Research on Chemical Intermediates, 2001, vol. 27, No. 6, pp. 643-658.
International Preliminary Report on Patentability for International (PCT) Patent Application No. PCT/US06/61227, mailed Jun. 5, 2008.
Appell, et al., "Converting Organic Wastes to Oil, A Replenishable Energy Source", Report of Investigations 7560, 1971, pp. 1-20, United States Department of the Interior, Bureau of Mines.
Author Unknown, "A way to turn driftwood into charcoal, vinegar and gas", Chemical Engineering, Apr. 2003, p. 19.
Berkley, "Considerations regarding the definition of remotely located integrated congeneration plants. Part 1", CIM Bulletin, Feb. 2003, pp. 59-63, vol. 96, No. 1068.

(Continued)

*Primary Examiner* — George Wyszomierski
*Assistant Examiner* — Tima M McGuthry-Banks
(74) *Attorney, Agent, or Firm* — Sheridan Ross, P.C.

(57) ABSTRACT

The invention provides efficient and effective processes for recovering metals such as aluminum, magnesium and lithium from mixed waste sources such as auto shredder residue, aluminum cans, waste particles of aluminum alloy and municipal waste. The metal-waste source is dissolved in a more noble metal solvent at a temperature at which contaminants do not dissolve. The purified metal is then recovered from the solvent, preferably by electrorefining.

18 Claims, No Drawings

U.S. PATENT DOCUMENTS

| | | |
|---|---|---|
| 2003/0106806 A1 | 6/2003 | Bandlish et al. |
| 2004/0216698 A1 | 11/2004 | Zilka et al. |
| 2005/0016326 A1 | 1/2005 | Furuya |
| 2005/0137078 A1 | 6/2005 | Anderson et al. |
| 2005/0139484 A1 | 6/2005 | Brooks et al. |

FOREIGN PATENT DOCUMENTS

| | | | |
|---|---|---|---|
| EP | 0272803 | | 6/1988 |
| EP | 0780457 | | 6/1997 |
| FR | 2322115 | | 3/1977 |
| GB | 2256435 | | 4/1995 |
| JP | 59059846 A | * | 4/1984 |
| WO | WO 91/05735 | | 5/1991 |

OTHER PUBLICATIONS

Boley, et al., "Entrainment Drying and Carbonization of Wood Waster", Report of Investigation 7282, Aug. 1969, pp. 1-15, United States Department of the Interior, Bureau of Mines.

Brisard, "An Electroanalytical Approach for Investigating the Reaction Pathway of Molecules at Surfaces", The Electrochemical Society-Interface, Summer 2007, pp. 23-25, vol. 16, No. 2.

Chase, "Microwave Pyroysis for Waster Minimisation: Recovery of Aluminium & Hydrocarbons from Packaging Laminates", Department of Chemical Engineering, University of Cambridge, at least as early as 2001, pp. 1-4.

Chemat, et al., "Microwave assisted pyrolysis of urea supported on graphite under solvent-free conditions", Tetrahedron Letters, 2001, pp. 3693-3695, vol. 42.

Cox, et al., "Separation of Mg and Mn from Beverage Can Scrap using a Recessed-Channel Cell", Journal of The Electrochemical Society, 2003, pp. D200-D208, vol. 150(12), The Electrochemical Society, Inc.

Cleland, et al., "Refining of aluminium bismuth and zinc alloys", Institution of Mining and Metallurgy, Sep. 1979, pp. 1-6.

El Harfi, et al., " Pyrolysis of the Moroccan (Tarfaya) oil shales under microwave irradiation", Fuel, 2000, pp. 733-742, vol. 79.

Kato, "Organic Wastes as BioMass Energy Resources and Carbon Dioxide Fixation From Brewery Processing Water", Brewery Association, 2001, pp. 758-762, vol. 96, No. 11, (Translated by The McElroy Translation Company, pp. 1-10).

Kobler, et al., "Plastics from Shredder Residue: Pilot Plant Experiences and Data", SME Annual Meeting, Denver, Colorado, 2001, pp. 1-6, SME.

Lee, et al., "Verifying Predictions of Water and Current Distributions in a Serpentine Flow Field Polymer Electrolyte Membrane Fuel Cell", Journal of The Electrochemical Society, 2003, pp. A341-A348, vol. 150, No. 3.

Lu, et al., "SOFCs for Firect Oxidation of Hydrocarbon Fuels with Samaria-Doped Ceria Electrolyte", Journal of The Electrochemical Society, 2003, pp. A354-A358, vol. 150, No. 3.

Menéndez, et al., "Microwave-induced pyrolysis of sewage sludge", Water Research, 2002, pp. 3261-3264, vol. 36.

Monsef-Mirzai, et al., "Rapid Microwave pyrolysis of coal", Fuel, 1995, pp. 20-27, vol. 74, No. 1.

Ogura, et al., "Reduction of $CO^2$ to Ethylene at Three-Phase Interface Effects of Electrode Substrate and Catalytic Coating", Journal of The Electrochemical Society, 2005, pp. D213-D219, vol. 152, No. 12.

Parry, et al., "Drying and Carbonizing Fine Coal in Entrained and Fluidized State", Report of Investigations 4954, Apr. 1953, pp. 1-43, United States Department of the Interior, Bureau of Mines.

Perry, et al., "Energy Utilization, Conversion, and Resource Conservation", Perry Chemical Engineering Handbook, Sixth Edition, Section 9-4, 1984.

Perry, et al., "Solid Fuels", Perry Chemical Engineering Handbook, Sixth Edition, Section 9-7, 1984.

Sasaki, et al., "Equilibria in Fuel Cell Gases: I Equilibrium Compositions and Reforming Conditions", Journal of The Electrochemical Society, 2003, pp. A878-A884, vol. 150, No. 7.

Venkataraman, et al., "Development of new CO Tolerant Ternary Anode Catalysts for Proton Exchange Membrane Fuel Cells", Journal of The Electrochemical Society, 2003, pp. A278-A284, vol. 150, No. 3.

Wolfson, et al., "Destructive Distillation of Scrap Tires", Report of Investigations 7302, Sep. 1969, pp. 1-19, United States Department of the Interior, Bureau of Mines.

International Search Report for International (PCT) Patent Application No. PCT/US06/61227, mailed Nov. 16, 2007.

Written Opinion for International (PCT) Patent Application No. PCT/US06/61227, mailed Nov. 16, 2007.

Nicks, et al., "Catalytic Activity of Rare-Earth Oxides for the Oxidation of Hydrogen", Reno Metallurgy Research Center; Report of Investigation 7841, 1973, 11 pages, United States Department of the Interior, Bureau of Mines, Reno, NV.

* cited by examiner

METHODS OF RECOVERING AND PURIFYING SECONDARY ALUMINUM

CROSS REFERENCE TO RELATED APPLICATIONS

This application is a national stage application under 35 U.S.C. 371 of PCT Application No. PCT/US2006/061227 having an international filing date of Nov. 22, 2006, which designated the United States, which PCT application claimed the benefit of U.S. Provisional Patent Application Ser. No. 60/739,140, filed Nov. 22, 2005. The entire disclosure of this priority document is incorporated herein by reference.

FIELD OF THE INVENTION

The invention relates to methods for recovering aluminum from sources of mixed metals and metals mixed with organics.

BACKGROUND OF THE INVENTION

Processes for effectively converting organics to carbon and steam have recently been disclosed. For example, co-pending PCT publication WO 2004/096456 A2 and U.S. patent publication 2004/0253166 A1 disclose means of delaquering, decoating, and recovering aluminum that is mixed with organics. Secondary aluminum occurs in these mixtures from many diverse sources, such as auto shredder residue, aluminum cans, waste particles of aluminum alloy and municipal waste. These resources represent very large potential sources of aluminum that are now only being exploited in very limited amounts.

There are two problems with these sources of aluminum metal that prevent the full recovery and use of these resources. First, the aluminum in foil and used beverage containers is very thin. When melted into a liquid aluminum at 700° C. using the conventional techniques, it is difficult to prevent substantial losses due to burning. Salt coverings are used to reduce these losses, but these coverings also become contaminated and therefore are another source of aluminum loses. Second, the material in auto shredder residue and municipal waste is a mixture of many different kinds of aluminum alloys and other metals such as copper and zinc. Many of these aluminum alloys are not compatible with each other and are harmed by the presence of other metals. A number of complex sorting and separation schemes are known, but they are expensive, inconclusive, and generally ineffective given the small particle size associated with metal recovery from these sources. Because of these problems, very large tonnages of secondary aluminum are currently exported to countries with low labor costs for stripping and sorting these diverse aluminum sources prior to purification. This practice of exporting these sources of aluminum results in a need to import very large amounts of purified aluminum.

Thus, to overcome these costly practices of shipping, sorting and importing secondary metals, there is a need for a process capable of efficiently recovering high yields of pure aluminum from low-grade, secondary sources that may be contaminated with other metals and/or organic materials. It would also be desirable to jointly recover valuable aluminum alloying materials such as magnesium and lithium as master alloys for recycle in these processes.

SUMMARY OF THE INVENTION

The processes of the present invention meet these goals by providing a means to recover and recycle aluminum from a large number of sources. The processes have the very desirable effect of converting low grade, secondary aluminum into commercially pure aluminum ready for use. The process has two interdependent steps including the dissolution of the solid aluminum into a carrier metal, such as molten zinc or tin, followed by recovery of the purified aluminum from the more noble metal solvent.

The aluminum is recovered in high yield because the dissolution occurs at temperatures below that at which severe oxidation occurs. Yield is not hurt by the thinness or small particle size of the aluminum. Indeed, these factors enhance the rapid dissolution of the aluminum metal.

In the processes of the invention, secondary aluminum is not melted at the conventional temperatures of 700° C. to 750° C., but rather at temperatures which are 200° C. to 250° C. lower. A melting temperature between about 500° C. and about 600° C. is used, while a temperature between about 530° C. and about 560° C. is preferred. In this temperature range, it is possible to vary the aluminum content of the alloy while reducing the amount of impurities carried with dissolved aluminum. While it is desirable to carry as much aluminum as practical by using higher temperatures, the use of a lower temperature will eliminate more of the impurities as solids. For example, at about 500° C., an alloy of 73 wt % zinc and 27 wt % aluminum is formed. At a temperature of about 550° C., the alloy formed is 58 wt % zinc and 42 wt % aluminum. At a temperature of about 600° C., an alloy of 33 wt % zinc and 67 wt % aluminum is formed. At about 500° C., the solubility of copper in zinc is 5 wt %, whereas at about 600° C. it is 10%. The solubility of manganese in zinc at about 500° C. is 5 wt % and at about 600° C. is 12 wt %. The solubility, and therefore the separation of impurities, improves at lower temperatures. At about 550° C. the zinc solvent is an efficient carrier with a high removal of impurities.

Many impurities present in the sources of secondary aluminum, including silicon and chromium, have a very limited solubility in zinc at 550° C. and are therefore readily removed by drossing. At about 550° C., manganese and very active metals, such as magnesium, can be furtler depleted by the addition of zinc chloride to the melt producing the corresponding metal chlorides for elimination and additional zinc metal.

The second step in the processes of the present invention is the recovery of the melted aluminum, preferably by electrorefining of the aluminum from the more noble zinc solvent. Methods of such recovery by electrorefining are generally known in the art. For example, the principles of such electrorefining are described in European Patent No. 272 803 and U.S. Pat. No. 4,118,292, both of which are incorporated herein by reference. The teachings of these patents to Fray are well suited to provide the low voltage refining from the zinc aluminum alloy. In a preferred embodiment of the present invention, the Fray packed bed electrorefining and electrolysis cell described in U.S. Pat. No. 4,118,292 is modified from its vertical position to a horizontal position and the packed bed is replaced by weirs, over which the alloy flows to create turbulence so that the aluminum depleting from the surface is replaced. This cell differs from the conventional fused salt, tliree layer cell, in that the thick salt layer is made thin by imposing an inert woven ceramic pervious to the salt(s) but not the molten metal, which contains the salt and provides a thin, low resistance barrier between the anodic heavy aluminum and the cathodic pure aluminum.

While zinc is the preferred solvent in the methods of the present invention, tin may be substituted as the solvent when a very high purity aluminum is desired. While tin has a lower carrying ability, it has the advantage of an extremely low vapor pressure, which results in a very low transfer of solvent between the alloy and the pure aluminum.

At operating temperatures, zinc has a substantial vapor pressure that will approach 680° C. to 700° C. at the salt interface between the liquid aluminum metal and the lower temperature alloy. In the electrorefining cells of the present invention, the temperature of the incoming alloy is controlled to maintain a temperature that is lower than the molten aluminum above the incoming alloy.

A current density used is between about 500 amperes per square foot and about 2000 amperes per square foot, with a current density of about 1000 amperes per square foot being preferred. The resistance of the thin salt in the bed is still sufficient to create a high heat flux at these referred high current densities.

DETAILED DESCRIPTION OF THE INVENTION

The present invention is drawn to a process that effectively and efficiently reclaims secondary aluminum from mixed waste sources. In this process, the aluminum is dissolved in a solvent and thereby separated from undesirable wastes present. The aluminum is then recovered from the solvent. In instances in which magnesium or lithium are present, these metals may also be recovered by the methods of the present invention. In one embodiment of the invention, the waste containing the secondary aluminum is dissolved in a zinc solvent at a temperature between about 500° C. and about 600° C. and the aluminum is recovered from the solvent by electrorefining.

The secondary aluminum may be dissolved into the zinc solvent in any convenient dissolver apparatus within the temperature range. In a preferred embodiment, the dissolution of the aluminum, and magnesium or lithium where present, is conducted in a rotary furnace, indirectly heated on its shell. Internal to the furnace is a spiral which acts in the same way as a cement truck in that, as the shell rotates in one direction, solids are moved forward and exit the front, while the liquid alloy passes through holes in the spiral. Zinc solvent is fed to the inside of the shell. Depleted aluminum alloy returned from an electrorefining cell may also be fed to the inside of the shell simultaneously with or in a similar manner to the zinc solvent. A feeder, such as a screw feeder, feeds the secondary metal/waste to the inside of the furnace. Certain insoluble materials, such as silicon, will tend to float on the aluminum-zinc alloy. At the rear of the furnace there is a dross ladle which passes through the surface of the alloy and removes floating solids which are discharged to a conveyor on the rear center line. The pregnant alloy overflows a weir to a launder, which carries it to a temperature controlled holding vessel for transfer to the refining cells. The furnace, spiral, and drossing fixtures are all protected by suitable refractory coatings.

The retention time for the aluminum-containing feed is a function of its thickness or massiveness. Generally, one-half hour to about one hour will be a sufficient retention time to effectively dissolve the secondary aluminum present in the source materials.

The heat needed for the endothermic dissolution of aluminum is preferably provided by the recycling alloy and by heat on the external surface of the shell. This heat may be provided by gas combustion, but the gas stream from the cooling of the refining cells may also be used as a heat source for the dissolution process.

There are many suitable electrorefining apparatuses known in art that are suitable for recovering the aluminum dissolved in the solvent. In one embodiment of the invention, the refining cell in is a vertical configuration as illustrated in U.S. Pat. No. 4,118,292, which is incorporated herein by reference. This configuration is particularly desirable in instances when magnesium or lithium are present and must be removed from the zinc-aluminum alloy prior to the transfer of the bulk of the aluminum.

More preferably, an electrorefining cell having a horizontal configuration is employed. In one embodiment, a graphite block is machined to provide channels in which the aluminum-zinc alloy (typically having 40 wt % aluminum) is flowed. This is connected to the cell anode. Multiple weir are configured on the bottom of the channels causing the flow to be turbulent and bring fresh alloy to the depleting surface.

Ceramic woven cloths that function as a diaphragm are positioned in the channels. Suitable woven ceramics for use in these cells include aluminum silicates, high alumina ceramic, zirconia and other ceramics. These ceramic cloths are fed molten salt from a down corner to provide a layer of salt in the cloth and below it. This provides a barrier to the liquid anodic alloy and the cathodic aluminum or aluminum-magnesium alloy. The salt is chosen to be lighter than the alloy but heavier than the pure aluminum. Suitable salts include equimolar sodium chloride-aluminum chloride with magnesium chloride and sufficient barium chloride for the needed density. The salt is provided from a down spout to seep along the cloth, overflow a weir and be recycled or purified as needed.

The top ridges of the channels are covered with a ceramic to provide support to the ceramic cloth diaphragm and to insulate the anode from the pure aluminum cathode. The depleted zinc solvent passes over a weir and out of the cell to be returned to the dissolver apparatus, or to further purification processing as required.

The electrorefining cell may be divided into two zones. A first zone may refine out magnesium as an aluminum-magnesium master alloy. A 40 wt % aluminum-magnesium alloy is a very useful and valuable product and the refining may be ceased with the production of this alloy, if desired.

The cathode is preferably a graphite block machined to provide cathodic leads into the aluminum cathode. As aluminum accumulates in this cathodic section, it overflows a weir and exits the cell. An argon blanket may be used to protect the top surface of the aluminum.

By machining the top surface of the cathode into the anode configuration, a bipolar cell may be constructed and a stack of such bipolar units may be prepared for commercial operations.

A high current density is preferably used for the electrorefining process. The current density is preferably in the range of about 500 amps per square foot to about 1500 amps per square foot at 0.5 to about 1.5 volts depending on the salt layer thickness prepared.

At these high current densities, a great deal of heat is generated. In one embodiment, this heat is removed by holes drilled in the anodic section of the electrorefining cell below the level of the zinc and fitted with ceramic pipes. These pipes, in combination with air cooling can control the cell temperature. Preferably, the pure aluminum is maintained at about 700° C., but the zinc alloy is kept below about 600° C. This heat may be usefully transferred to and used in the dissolving stage.

The cell is provided with a surrounding ceramic that is at salt level and extends up to the level of the cathodic aluminum and down to the zinc alloy level. This provides containment with shifting levels of the components.

Where very high purity aluminum is desired, a tin solvent may be substituted for the zinc. Tin has a very low vapor pressure at aluminum melting temperatures. It may then be desirable to refine the aluminum a second time by taling aluminum refined from a zinc solvent and re-processing that aluminum using the processes of the present invention with a tin solvent. This second dissolution and refining from tin results in a much higher purity aluminum, but, because tin is more expensive and less efficient than zinc, this re-processing should be reserved for applications in which a very high purity aluminum is required.

Additional objects, advantages, and novel features of this invention will become apparent to those skilled in the art upon examination of the following examples thereof, which are not intended to be limiting.

EXAMPLES

Example 1

To ascertain the effectiveness of dissolving secondary aluminum in zinc on a commercial scale (as opposed to melting aluminum), the yield of a large amount of dissolved secondary aluminum was measured. Three tons of molten zinc solvent where placed in a die casting kettle and held at 525° C. Three additions of shredded, delaquered used beverage cans totaling 1984 pounds were added to the zinc solvent. The average recoveries from these aluminum additions were aluminum 88% and magnesium 98%. Drossiig lowered the manganese content nearly 50% to about 0.8%. This illustrates the high yields obtainable by dissolving secondary aluminum as opposed to melting, even with a very thin source of secondary aluminum.

Example 2

Similar to Example 1 above, the yield obtained by dissolving scrap aluminum alloys in zinc was tested by dissolving 1992 pounds of alloy 380 borings and shavings a three tons of molten zinc in three batches. The 380 alloy is nominally 92% aluminum, 8.5% silicon and 0.5% manganese. Despite the fineness of the feed materials, the recovery of aluminum in the three additions averaged about 92%. Drossing lowered the level of manganese combined with silicon to about 0.01% and the silicon to about 1.35%. This illustrates the high yields and purifications obtainable by the zinc dissolution system.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for the recovery of metals comprising:
   dissolving a source of aluminum metal in a solvent comprising a molten metal selected from the group consisting of molten zinc, molten tin, and a combination thereof, at a temperature between 500° C. and 600° C. to form a liquid aluminum-solvent mixture, wherein the dissolving is conducted in a rotary furnace;
   drossing a precipitated metal from the liquid aluminum-solvent mixture;
   electrorefining aluminum from the aluminum-solvent mixture to recover aluminum metal from the aluminum-solvent mixture.

2. The method of claim 1, wherein the source of aluminum metal is selected from the group consisting of automobile shredder residue, aluminum cans and municipal waste.

3. The method of claim 1, wherein the aluminum metal source is an aluminum alloy selected from the group consisting of magnesium-aluminum alloys, and lithium-aluminum alloys.

4. The method of claim 1, wherein the dissolving is conducted at a temperature between about 530° C. and about 560° C.

5. The method of claim 1, wherein the rotary furnace comprises at least one of a screw feeder, a dross ladle, an external heat source and a refractory coating.

6. The method of claim 1, wherein the dissolving is conducted for a time period between about one half hour and about one hour.

7. The method of claim 1, wherein the electrorefining is conducted in an electrorefining cell comprising a graphite block having channels in which a molten aluminum alloy may flow.

8. The method of claim 7, wherein the channels comprise wiers which cause turbulence in the flow of the molten aluminum alloy.

9. The method of claim 7, wherein the channels comprise a ceramic woven cloth layered with a molten salt.

10. The method of claim 9, wherein the salt is selected from the group consisting of sodium chloride, aluminum chloride, magnesium chloride, barium chloride and combinations thereof.

11. The method of claim 7, wherein the electrorefining cell comprises ceramic pipes to dissipate heat generated in an electrorefining process conducted in the electrorefining cell.

12. The method of claim 1, wherein the current density used in the electrorefining is between about 500 amperes per square foot and about 2000 amperes per square foot.

13. A method for the recovery of metals comprising:
   dissolving a source of aluminum metal in a solvent comprising a molten metal selected from the group consisting of molten zinc, molten tin, and a combination thereof, at a temperature between 500° C. and 600° C. to form a liquid aluminum-solvent mixture;
   drossing a precipitated metal from the liquid aluminum-solvent mixture;
   electrorefining aluminum from the aluminum-solvent mixture to recover aluminum metal from the aluminum-solvent mixture, wherein the recovering comprises:
   electrorefining the aluminum metal from the solvent;
   dissolving the aluminum metal in a second solvent; and,
   recovering the aluminum metal from the second solvent.

14. The method of claim 13, wherein the source of the aluminum metal is selected from the group consisting of automobile shredder residue, aluminum cans and municipal waste.

15. The method of claim 13, wherein the source of the aluminum metal is an aluminum alloy selected from the group consisting of magnesium-aluminum alloys, and lithium-aluminum alloys.

16. A method for the recovery of metals comprising:
dissolving a source of aluminum in a solvent comprising molten zinc;
electrorefining the aluminum from the solvent;
dissolving the aluminum in a second solvent comprising molten tin; and
electrorefining the aluminum from the second solvent.

17. The method of claim 16, wherein the source of aluminum is selected from the group consisting of automobile shredder residue, aluminum cans and municipal waste.

18. The method of claim 16, wherein the source of aluminum is an aluminum alloy selected from the group consisting of magnesium-aluminum alloys, and lithium- aluminum alloys.

* * * * *